United States Patent [19]
Stadtfeld et al.

[11] Patent Number: 5,951,219
[45] Date of Patent: Sep. 14, 1999

[54] CHIP REMOVAL APPARATUS FOR MACHINE TOOL

[75] Inventors: Hermann J . Stadtfeld; Donald W. Palmateer, Jr., both of Rochester, N.Y.

[73] Assignee: The Gleason Works, Rochester, N.Y.

[21] Appl. No.: 09/144,808

[22] Filed: Sep. 1, 1998

Related U.S. Application Data

[60] Provisional application No. 60/057,963, Sep. 5, 1997.

[51] Int. Cl.$^6$ ..................................... B23F 23/00
[52] U.S. Cl. .............................. 409/131; 408/67; 409/27; 409/137; 451/456
[58] Field of Search ................................ 408/67, 241 G; 409/27, 38, 51, 131, 137; 29/DIG. 50, DIG. 79, DIG. 84, DIG. 94; 451/453, 456; 144/252.1

[56] References Cited

U.S. PATENT DOCUMENTS

| | | | |
|---|---|---|---|
| 2,359,931 | 10/1944 | Moffitt | 408/67 |
| 3,533,327 | 10/1970 | Hagerty | 409/137 |
| 3,534,658 | 10/1970 | Carsey | 409/137 |
| 4,514,936 | 5/1985 | Hurtado . | |
| 4,981,402 | 1/1991 | Krenzer et al. . | |
| 5,069,695 | 12/1991 | Austin . | |
| 5,172,680 | 12/1992 | Swan . | |
| 5,295,771 | 3/1994 | Wehrmann et al. . | |
| 5,451,122 | 9/1995 | Noda et al. | 409/137 |
| 5,586,848 | 12/1996 | Suwijn et al. . | |

FOREIGN PATENT DOCUMENTS

| | | |
|---|---|---|
| 0667209 | 8/1995 | European Pat. Off. . |
| 9420667 | 2/1995 | Germany . |
| 4443421 | 6/1995 | Germany . |
| 1454649 | 1/1989 | U.S.S.R. ................................ 409/137 |

OTHER PUBLICATIONS

WPI/Derwent Patent Abstracts, Soviet Union Patent No. 1349981, Nov. 7, 1997.
Phillips, Robert, "New Innovations in Hobbing–Part II", *Gear Technology*, Nov./Dec. 1994, pp. 26–30.
Ophey, Lothar, "Gear Hobbing Without Coolant", *Gear Technology*, Nov./Dec. 1994, pp. 20/24.
Stadtfeld, Hermann J., "Gleason Power–Dry–Cutting of Bevel and Hypoid Gears", The Gleason Works, May 1997.

*Primary Examiner*—Daniel W. Howell
*Attorney, Agent, or Firm*—Robert L. McDowell

[57] ABSTRACT

An apparatus for directing chips emanating from a workpiece being machined by a tool toward an outlet spaced from the workpiece. The apparatus comprises an enclosure surrounding the workpiece and tool for confining chips emanating from the workpiece to the enclosure for removal via an outlet. The enclosure includes spaced-apart first and second wall portions, a top portion, a bottom portion, a first end portion comprising separate tool and workpiece openings, a second end portion and the outlet located proximate the intersection of the bottom portion and the second end portion whereby a majority of chips emanating from the workpiece are projected toward and collide with the second end portion after which the majority of chips fall to the bottom portion and/or the outlet. Alternatively and preferably, the enclosure comprises a curved inner surface and the chips are directed toward and then travel along the inner surface into an outlet. The enclosure preferably further comprises means to project a gaseous stream along at least a portion of the inner surface for urging chips toward and/or into the outlet. The enclosure may also include means to enhance airflow from the outlet.

28 Claims, 13 Drawing Sheets

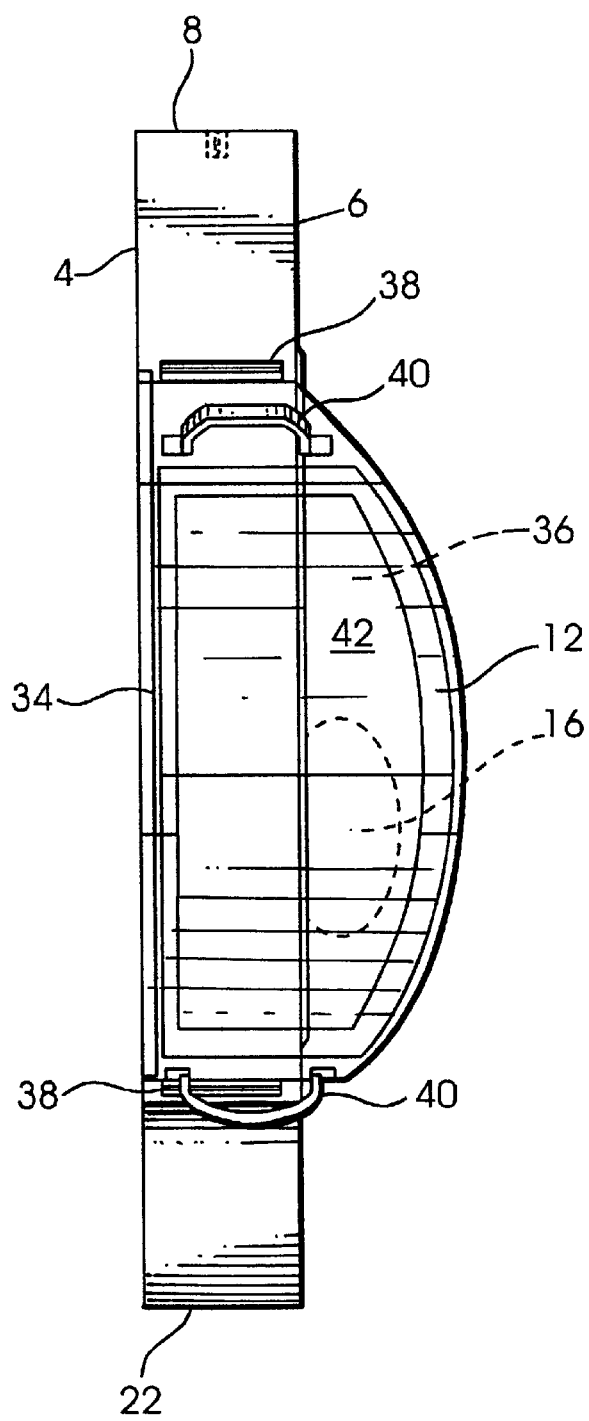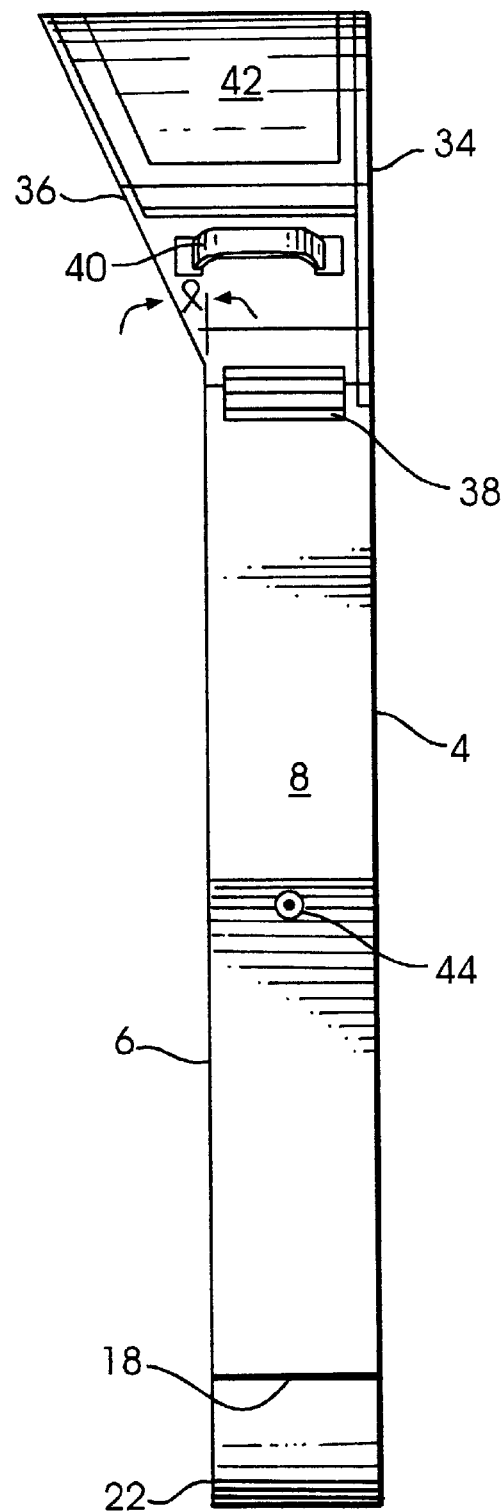
FIG. 3
FIG. 2

CHIP REMOVAL APPARATUS FOR MACHINE TOOL

This application claims benefit of Provisional application Ser. No. 60/057,963, filed Sep. 5, 1997.

FIELD OF THE INVENTION

The present invention relates to machine tools and the manner in which metal chips from machining processes are removed therefrom. Specifically, the present invention is directed to machines for producing bevel gears and an apparatus therein for directing chips away from the machining area.

BACKGROUND OF THE INVENTION

Traditionally, machining of metal workpieces to produce desired articles, such as hobbing processes to produce spur and helical gears, shafts, splines, and the like, or face milling and face hobbing processes to produce bevel and hypoid gears, have been performed in the presence of a coolant medium supplied to the point of engagement of a tool and workpiece. Aside from the obvious function of cooling the tool and workpiece, coolant also reduces tool wear and serves to flush metal chips, which emanate from a machined workpiece, away from the area of engagement of tool and workpiece and out of the machine. Once flushed away from the tool and workpiece, chips may separated from the coolant by filtering or by magnetic separator means as is well known in the art.

While coolant certainly has many advantages, it also has its drawbacks. Coolant is expensive to purchase, and in some cases disposal costs are just as expensive. Coolant mist and coolant oil smoke are considered to be environmental hazards. Therefore, machines must include a mist/smoke collector as a means to remove such airborne contaminants from the atmosphere within the machine enclosure. Coolant circulation in a machine tool requires a pump and hoses to deliver coolant to the machining area, and a chip separator to remove metal chips from the coolant. Such separators are somewhat more complicated than simple powered drag lines used to convey dry chips. In some cases, filters may be needed to remove other debris from the coolant, or a coolant chiller may be required to control both the coolant and the machine equilibrium temperature.

Recently, dry machining processes such as dry hobbing of cylindrical gears and dry cutting of bevel gears have drawn attention as an alternative to processes utilizing coolant (wet machining processes). See, for example, Phillips, "New Innovations in Hobbing—Part II", *Gear Technology*, November/December 1994, pp. 26–30, and, Stadtfeld, "Gleason POWERDRY-CUTTING™ of Bevel and Hypoid Gears", The Gleason Works, Rochester, N.Y., May 1997.

It may be seen that dry machining has the potential to overcome many serious and costly drawbacks associated with the use of a liquid coolant. Also, dry chips are normally more valuable as a recyclable material than chips which are residually wetted by a process fluid. Parts cut without coolant do not need washing, prior to further processing such as heat treatment.

However, the heat generated in dry machining processes is a contributor to tool wear and it also may have detrimental effects on the machine itself, causing differential growth of components such as spindles, bearings, or the machine frame. Much of the process heat in dry machining is removed by the chips that must be removed from the machine as quickly as possible and in a manner by which they do not contact the machine frame for any extended period of time.

One way to remove dry chips is to permit the hot chips to slide by gravity toward a chip conveyor built into the base of a hobbing machine. Such a chip removal system is shown in Ophey, "Gear Hobbing Without Coolant", *Gear Technology*, November/December 1994, pp. 20–24.

Another method of removing chips from a machine tool capable of wet and dry machining is known from U.S. Pat. No. 5,586,848 to Suwijn wherein the chips are discharged into the machine base where a reversible transfer mechanism carries them to respective wet or dry outlets.

It is an object of the present invention to provide a system to remove metal chips from a machine tool in a rapid manner such that heat from the chips is not transferred to the body of the machine tool.

SUMMARY OF THE INVENTION

The present invention is directed to an apparatus for directing chips emanating from a workpiece being machined by a tool toward an outlet spaced from the workpiece.

The apparatus comprises an enclosure surrounding the workpiece and tool for confining chips emanating from the workpiece to the enclosure for removal via the outlet. In a first embodiment the enclosure includes spaced-apart first and second wall portions, a top portion, a bottom portion, a first end portion comprising separate tool and workpiece openings, a second end portion and the outlet located proximate the intersection of the bottom portion and the second end portion whereby a majority of chips emanating from the workpiece are projected toward and collide with the second end portion after which the majority of chips fall to the bottom portion and/or the outlet.

Preferably, the chip removal apparatus of the present invention comprises a peripheral portion having a flange attached at one end thereof for securing the chip removal apparatus to a backing plate or directly to a machine tool. The other end of the peripheral portion is attached to a front portion made up of one or more sections that are arranged such that a tool and workpiece are provided appropriate space within the apparatus as is necessary to accommodate the angular separation between the tool and workpiece. The inner surface of the peripheral portion is curved, preferably circular, such that chips emanating from the tool-workpiece interface are projected toward the inner surface and ravel along the curved surface into an outlet where they are conveyed away from the machine tool.

The enclosure preferably further comprises means to project a gaseous stream along a portion of the inner surface of the apparatus for urging chips toward and/or into the outlet. Means to enhance air flow from the outlet may also be included.

BRIEF DESCRIPTION OF THE DRAWINGS

FIG. 2 illustrates a top view of the chip removal apparatus of FIG. 1.

FIG. 3 is an end view of the workpiece/tool end portion of the apparatus of FIG. 1.

DETAILED DESCRIPTION OF THE PREFERRED EMBODIMENTS

The present invention will now be discussed in detail with reference to preferred embodiments illustrated by the accompanying drawings. In all drawings, similar components will be referred to by like reference numbers.

In machining operations, such as cutting processes for forming bevel and hypoid gears, removal of chips is a crucial part of the machining operation. This is true for both wet machining processes, which employ a liquid medium to flush away chips, and dry machining processes in which chips contain much process heat and, therefore, must be quickly removed from the machine tool.

With the increased interest in cutting gears with carbide tooling particularly in the absence of coolant (i.e. dry cutting), there is an increased need to develop a means to quickly move the chips from the machine tool. Quickly removing chips is important in keeping process heat at a minimum to maintain machine tolerances within acceptable limits, but also with the increased speeds available with carbide cutting tools, considerably more chips are produced per unit of time and therefore it is likewise important to develop a chip removal means which can handle the increased rate of chip formation.

Figure 1:
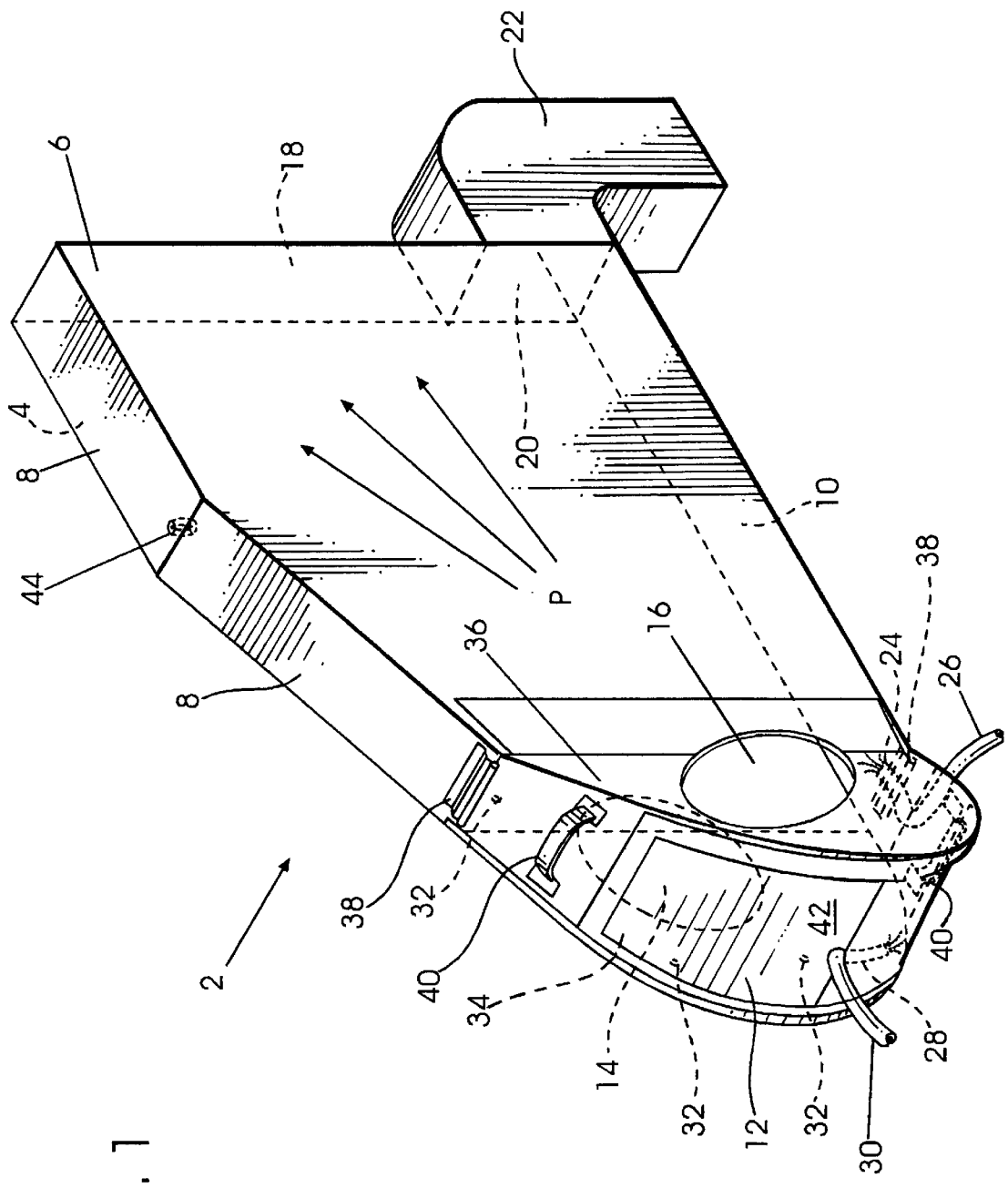
FIG. 1 is a perspective view of the preferred chip removal apparatus of the present invention.
Figure 6:
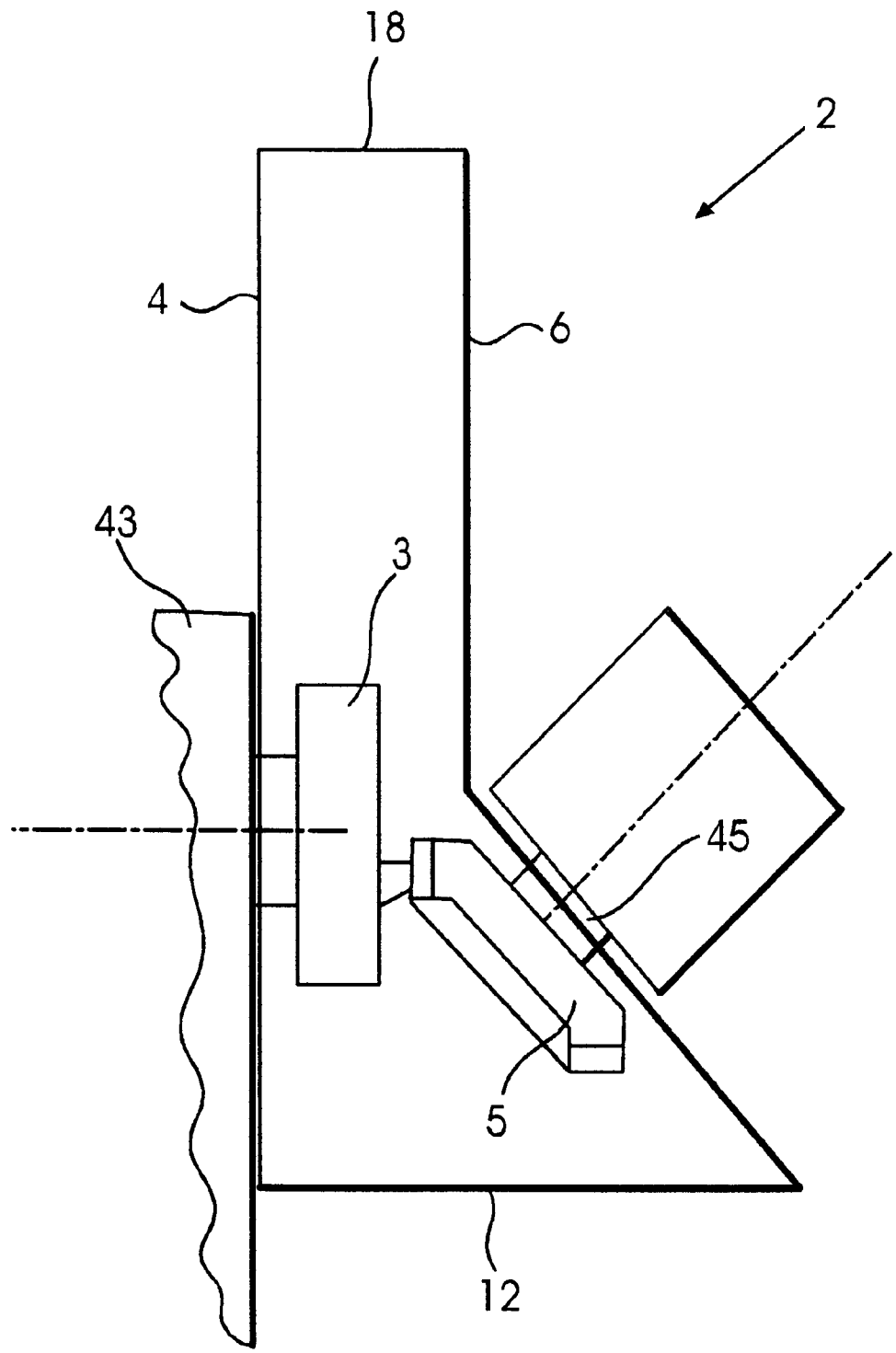
FIG. 6 shows the enclosure formed by the chip removal apparatus about an engaged tool and workpiece.

FIG. 1 illustrates a first embodiment of such a chip removal apparatus generally designated by 2. The apparatus comprises spaced-apart first wall portion 4 and second wall portion 6, top portion 8, bottom portion 10, first end portion 12, including openings 14 and 16 for a tool and workpiece to be inserted therethrough, second wall portion 18. A section of front wall portion 6 is oriented at an angle a (see FIG. 2) appropriate for providing the space necessary to accommodate the angular separation between the tool and workpiece. Together the above referenced components form an enclosure (see FIG. 6) that confines the tool 3 and workpiece 5, when engaged, and further provides a defined area to which chips are confined as they emanate from the workpiece during the machining operation. The inventive chip removal apparatus 2 is preferably made of sheet material (e.g. steel, stainless steel, aluminum, heat resistant plastic) 1–2 mm in thickness.

The chip removal apparatus is shaped to allow the majority of chips (on the order of about 80%) produced during machining to project from the workpiece along their natural tangential paths (P) which carry them toward the second end portion 18 which functions as a collision surface to stop chip flow. Upon colliding with the second end portion 18, the chips lose their momentum and fall, along the inner surface of second end portion 18, to the surface of the bottom portion 10 in the vicinity of outlet 20, formed in second end portion 18 at the bottom end thereof, which is connected to a suitable conveying means, such as a duct 22, for transporting the chips to a collecting receptacle or transporting device. Preferably, the dimension of outlet 20 is about 6 in.×6 in. (150 mm×150 mm). The chips are then urged into and through the outlet 22 by a gaseous (e.g. air) flow from nozzle 24 (FIG. 4) connected to supply line 26. If desired, bottom portion 10 may be sloped toward outlet 20 to assist chip flow.

For the remaining small volume of chips which do not project to the second end portion 18 but which instead are deposited on the surface of bottom portion 10 near the workpiece and tool, the gas flowing through nozzle 24 will likewise urge these chips toward outlet 20.

Figure 4:
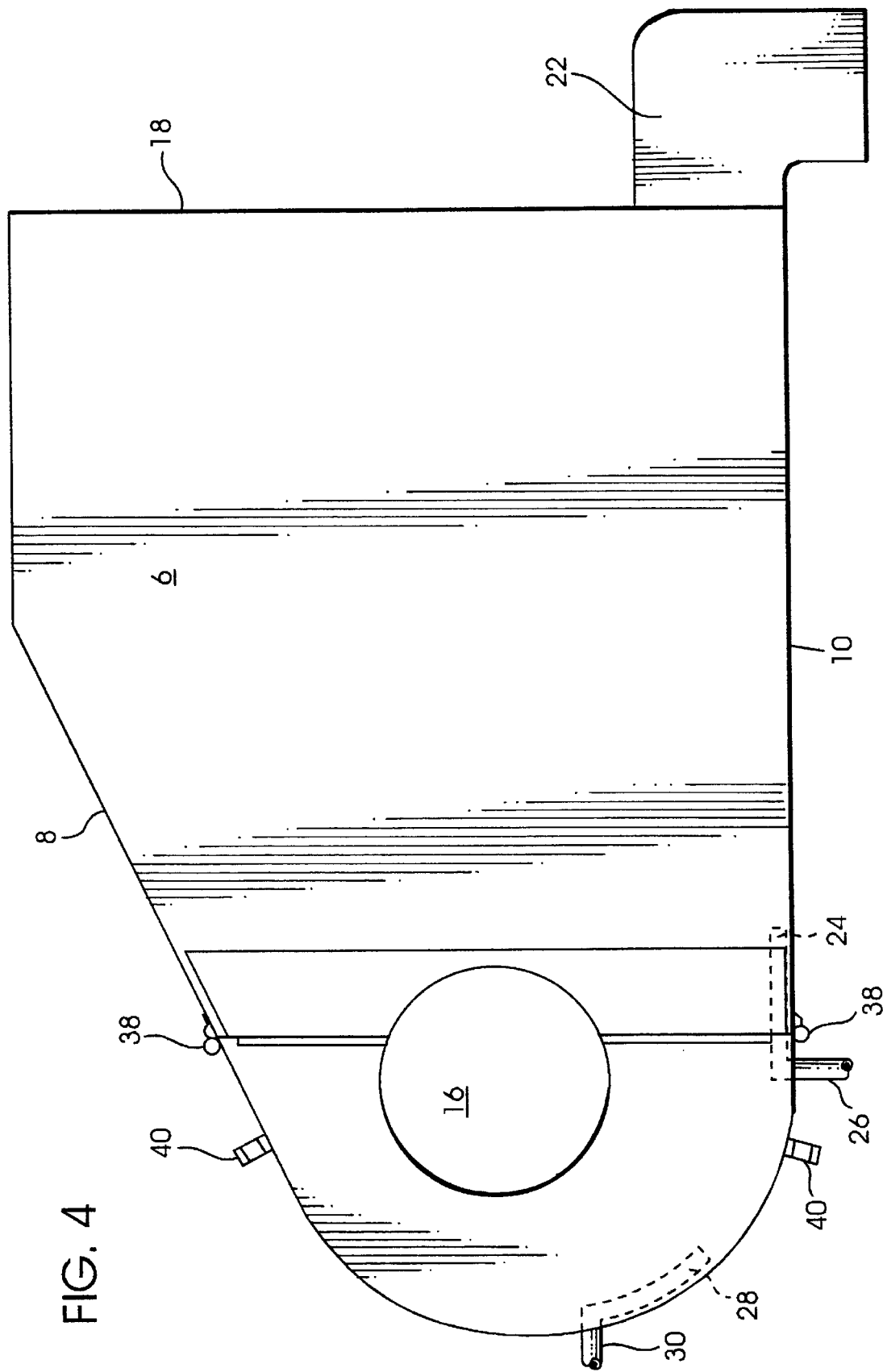
FIG. 4 illustrates a front view of the chip removal apparatus of FIG. 1.

It may also be expected that some small amount of chips will collect in the lower region of the first end portion 12. In order to remove any chips from this area, another gas nozzle 28 (with supply tube 30), as also seen in FIG. 4, is preferably included to move the chips onto the surface of the bottom portion 10 where the chips will be further moved along by the gas flowing from nozzle 24 to outlet 20.

The apparatus is mounted directly to the tool head 43 (FIG. 6) of a machine tool, for example, the machine disclosed in U.S. Pat. No. 4,981,402 to Krenzer et al. A means for attaching a hook from a lifting device, such as a crane, for installing or removing the chip removal apparatus in or from a machine tool is shown at 44. The chip removal apparatus is secured to the tool head via screws extending through openings such as shown, for example, at 32. In this manner, the chip removal apparatus may move with any motions of the tool head 43. The opening 14 allows passage of a tool 3, such as a cutting tool, into the enclosure. A workpiece 5, such as a ring gear blank, positioned on a work spindle 45 may then be inserted into opening 16 which may include a seal (not shown) to prevent the escape of chips from around the workholding equipment.

The machining of the workpiece is then commenced with the majority of chips emanating from the workpiece being projected primarily toward the interior surface of the second end portion 18 which stops their flight. The chips fall to the bottom surface 10 near the outlet 20 where air from nozzle 24 forces them through the outlet and into duct 22. Any chips falling along the bottom near the workpiece and tool are also swept away by nozzle 24 and those chips falling along the lower surface of first end portion 12 are swept toward the outlet by air from nozzle 28.

In dry cutting of many bevel gears, the chips emanating from the workpiece are large and somewhat flat which permits the chips to dissipate heat quickly. The action of the air in the apparatus also serves to remove additional heat from the chips thus resulting not only in rapid cooling of the chips but also the removal of heat from the machine interior since the air is also exhausted through the duct 22.

If desired, a vent (not shown) may be included in the surface of the chip removal apparatus if it is deemed that excessive air flow exists in the apparatus. However, this situation is rare and may only be encountered if the flow of air is somehow restricted through the outlet and duct 22.

As may also be seen in FIG. 3, the first end portion 12, a section 34 of the first wall portion 4 and section 36 of the second wall portion 6 may be removable, preferably as a singular unit, from the remainder of the chip removal apparatus. With this arrangement, different size tools, workpieces or relative positions between tool and workpiece can be accommodated without the need to replace the entire chip removal apparatus. The singular unit may be attached to the remainder of the chip removal apparatus by any suitable means such as pin and channel arrangement 38. To facilitate installing and/or removing the singular unit, handles 40 may be included. Furthermore, in order to view the machining operation, a transparent shield 42 may be included on the first end portion 12. The shield 42 may be made of safety-type glass or plastic. If desired, shield 42 may be hinged (at its top or bottom for example) to allow access to the interior of the chip removal apparatus 2.

It is preferred that when secured in a machine tool, the chip removal apparatus 2 be positioned such that second end portion 18 will be located near an outside wall of the machine tool. Duct 22, which may be any appropriate length, may then extend through the outside wall of the machine tool for conveying chips out of the machine interior and into any suitable receptacle or onto a chip transfer device.

Figure 5:
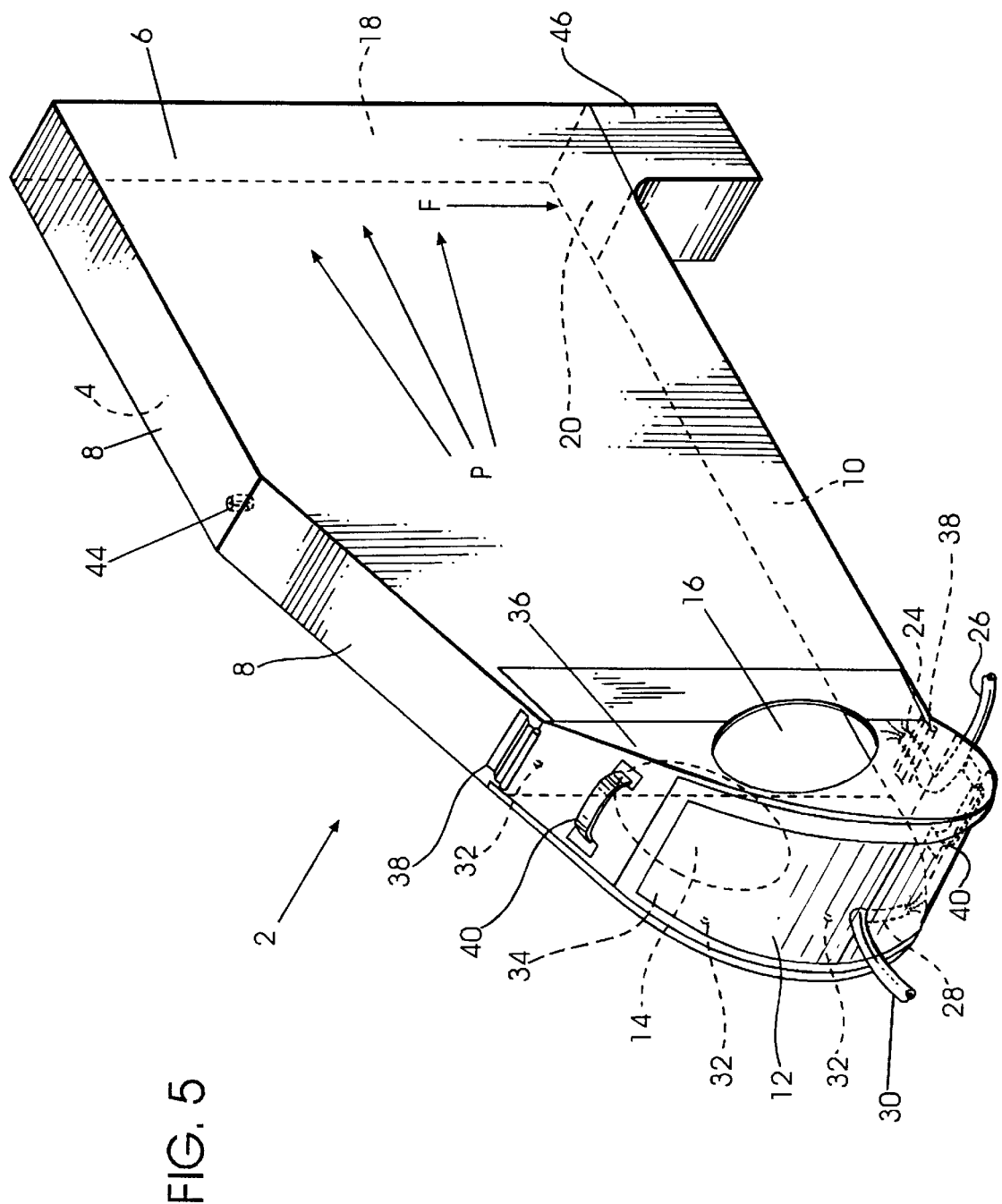
FIG. 5 shows a perspective view of an alternative embodiment chip removal apparatus.

In an alternative embodiment shown in FIG. 5, a portion of the chip removal apparatus adjacent second end portion 18 may extend outside of a machine tool. In this embodiment, chips colliding with the inside surface of second end portion 18 may fall (direction F) directly through outlet 20 and a duct 46 into a collection receptacle.

Figure 7:
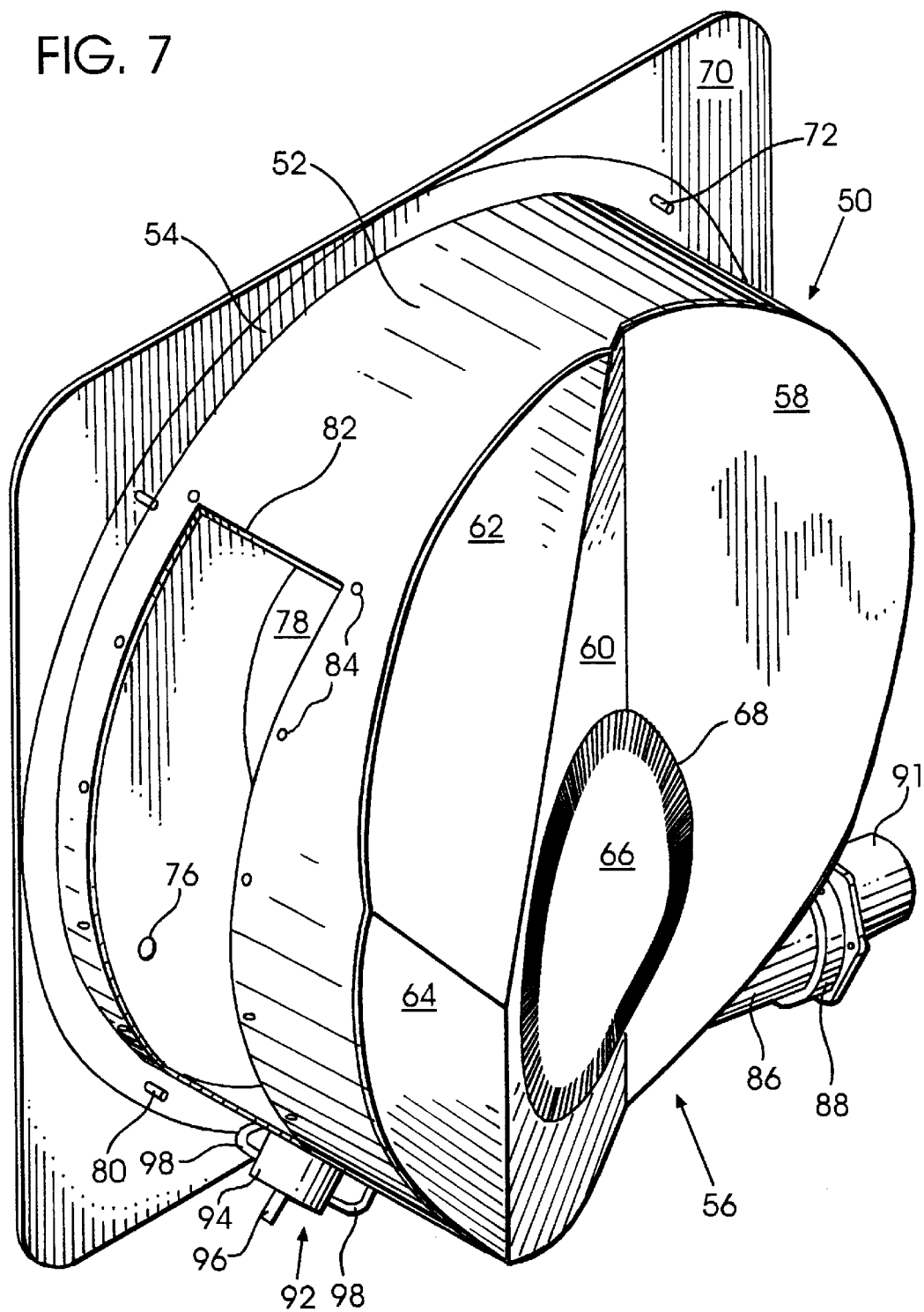
FIG. 7 is a perspective view of a preferred chip removal apparatus of the present invention.

FIGS. 7–14 illustrate the preferred embodiment of the present invention wherein the generally elongate-shaped chip removal enclosure 2 with end wall 18 of FIG. 1 is replaced with a chip removal enclosure designated by 50 in FIG. 7 in which chips are projected toward and move along a curved, preferably circular, surface that guides them into an outlet from which they are conveyed away from the machine tool.

The chip removal 50 is generally cylindrical comprises a peripheral portion 52 having a curved, preferably circular, inner surface 53, a mounting flange 54 attached to one end of peripheral portion 52 and a front portion, designated generally by 56, located at the other end of the peripheral portion 52. In FIG. 7, front portion 56 comprises a plurality of sections 58, 60, 62 and 64. Sections 58 and 60 are oriented at an angle β (see FIG. 8) appropriate for providing the space within the apparatus necessary to accommodate the angular separation between a tool and workpiece. Sections 62 and 64 are transition sections for connecting peripheral portion 52 and angled section 60.

An opening 66 is formed in front portion 56 in order that a workpiece can be moved into and out of the chip removal apparatus 50. The opening 66 preferable includes a sealing means, such as a brush-type compliant seal 68 made of nylon, for example, to prohibit chips from escaping the apparatus 50 via the area around the workpiece spindle. The placement and size of opening 66 may vary and is dependent upon the particulars of the process utilized and the workpiece being machined as can be appreciated by the skilled artisan. For example, if there will be translational movement of a workpiece spindle during machining, such as may be involved in a generating process, hole 66 and/or seal 68 need to be sized accordingly to accommodate these dimensional requirements. In FIGS. 7–10, the illustrated chip removal apparatus 50 is configured for machining of a bevel ring gear.

Figure 8:
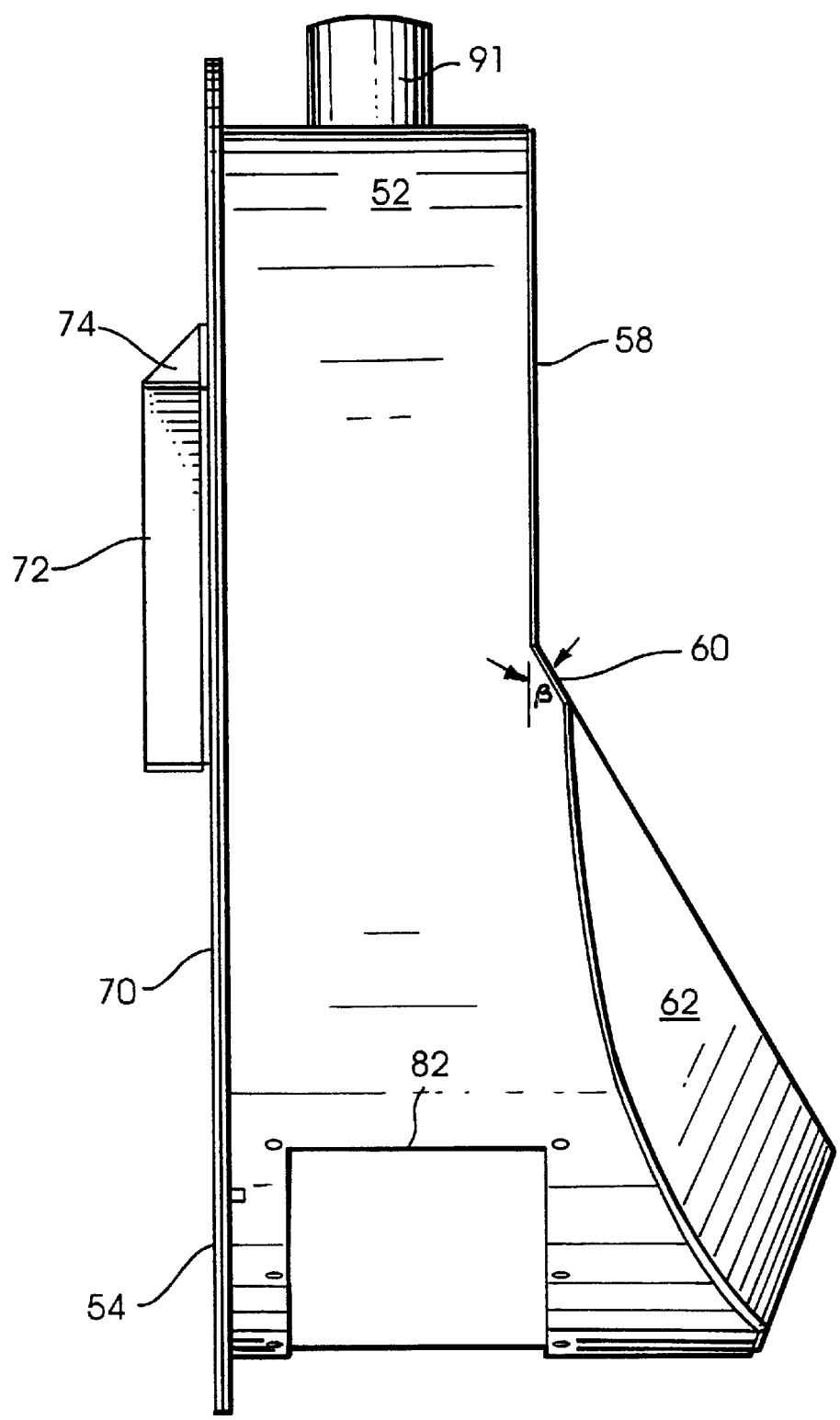
FIG. 8 illustrates a top view of the chip removal apparatus of FIG. 7.
Figure 9:
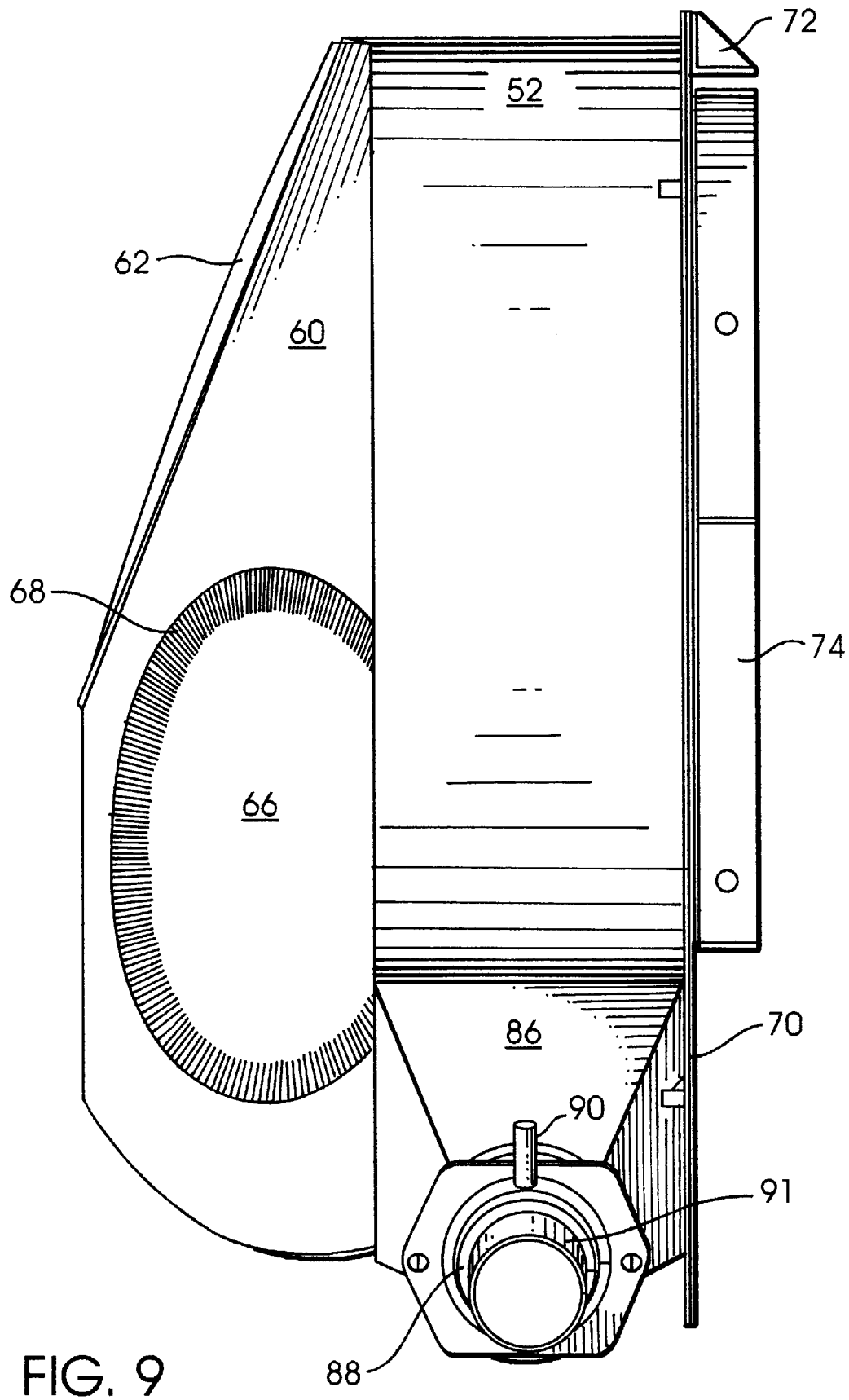
FIG. 9 shows a discharge end view of the apparatus of FIG. 7.

Chip removal apparatus 50 may be secured directly to a machine tool via mounting means, such as screws, extending through flange 54. However, the preferred means for mounting apparatus 50 to a machine tool is via a backing plate 70, preferably made of sheet metal such as steel or aluminum, which in turn is mounted to a surface or component of a machine tool. In FIG. 8, top mounting bracket 72 is shown which, for example, is secured to the top of a tool head or slide (not shown) of a gear cutting machine such as the type shown in previously mentioned U.S. Pat. No. 4,981,402. Similarly, FIG. 9 shows side mounting bracket 74 that is also secured to the machine, usually to the same component as top bracket 72. Alternative to, or in addition to, mounting brackets 72 and 74, backing plate 70 may be directly mounted to a machine tool surface via means such as screws extending through a plurality of holes 76 (only one shown) positioned about the surface of backing plate 70. Backing plate 70 includes access hole 78 to permit passage of a tool, such as a gear cutting tool, into chip removal apparatus 50.

In order to secure peripheral portion 52 to backing plate 70, a plurality of fastening elements 80, such as threaded studs, extend from backing plate 70 and through correspondingly positioned holes in flange 54. Once positioned in this manner, a nut or similar element is positioned on the fastening element and tightened.

The chip removal apparatus of the present invention may include an opening 82 over which a hinged door (not shown) or window (not shown) may be placed. If a window is installed, it may be secured to peripheral portion 52 such as by screws or bolts extending through holes 84.

Figure 10:
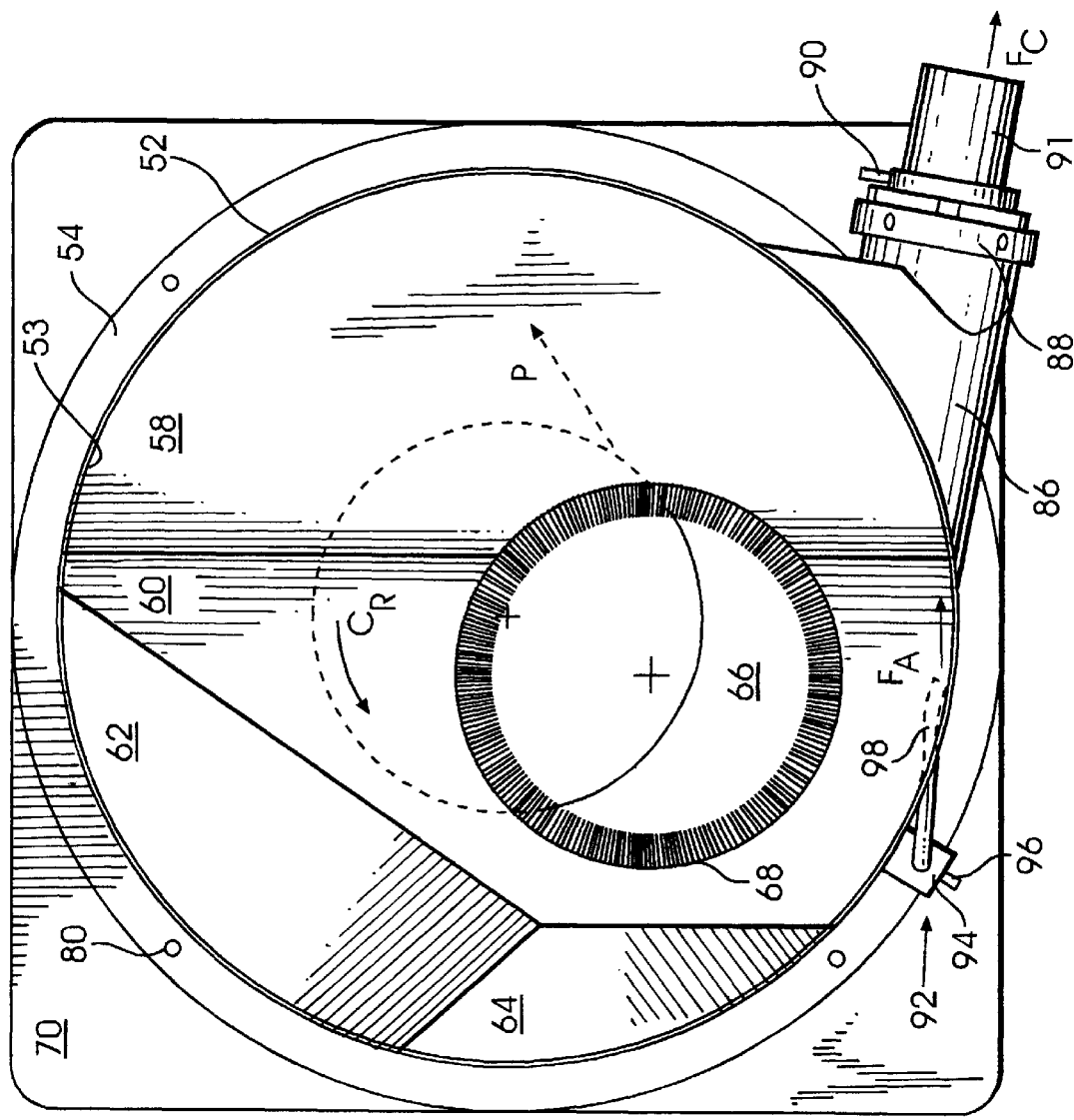
FIG. 10 shows a front view of the chip removal apparatus of FIG. 7.
Figure 11:
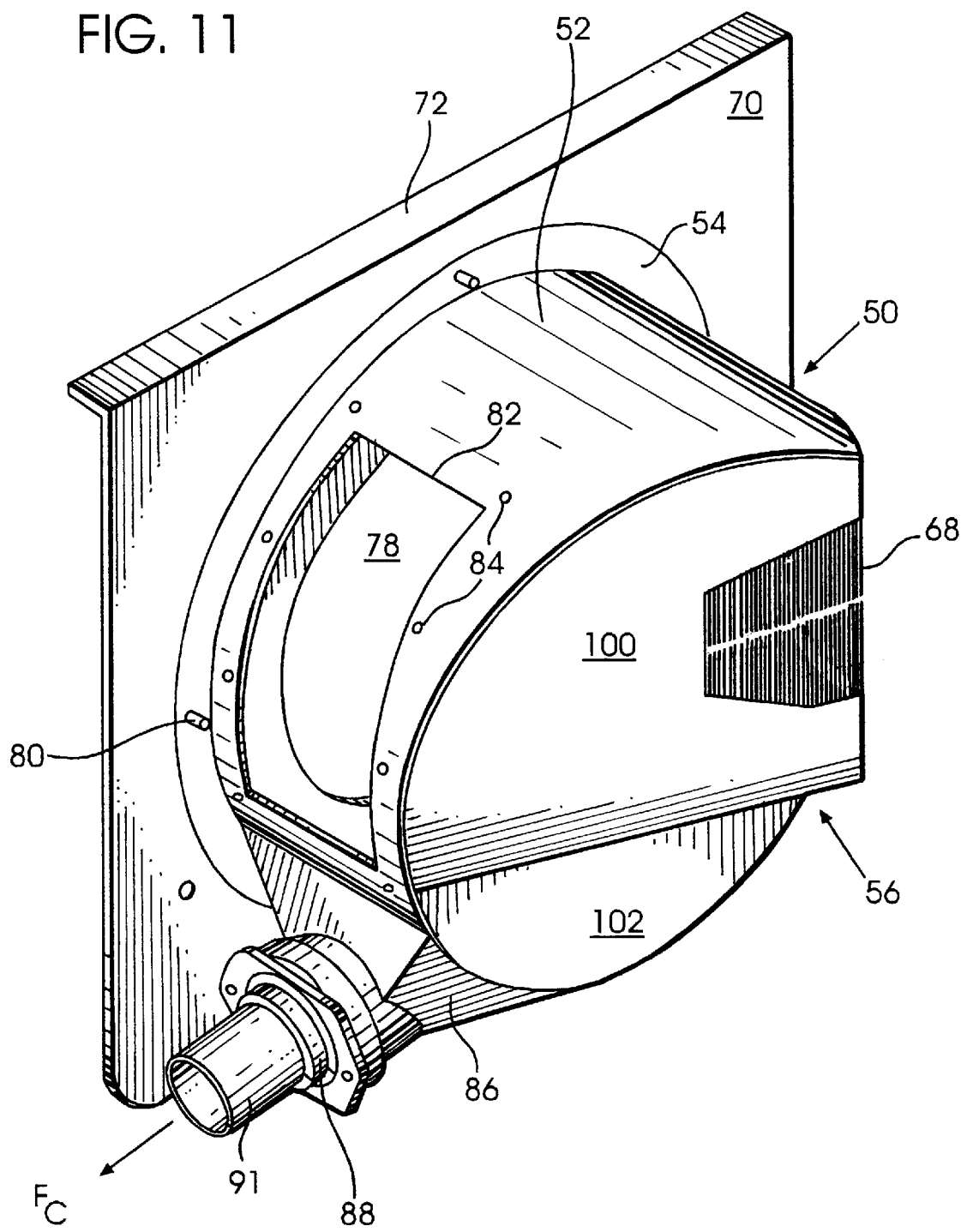
FIG. 11 shows a perspective view of another preferred chip removal apparatus of the present invention.
Figure 12:
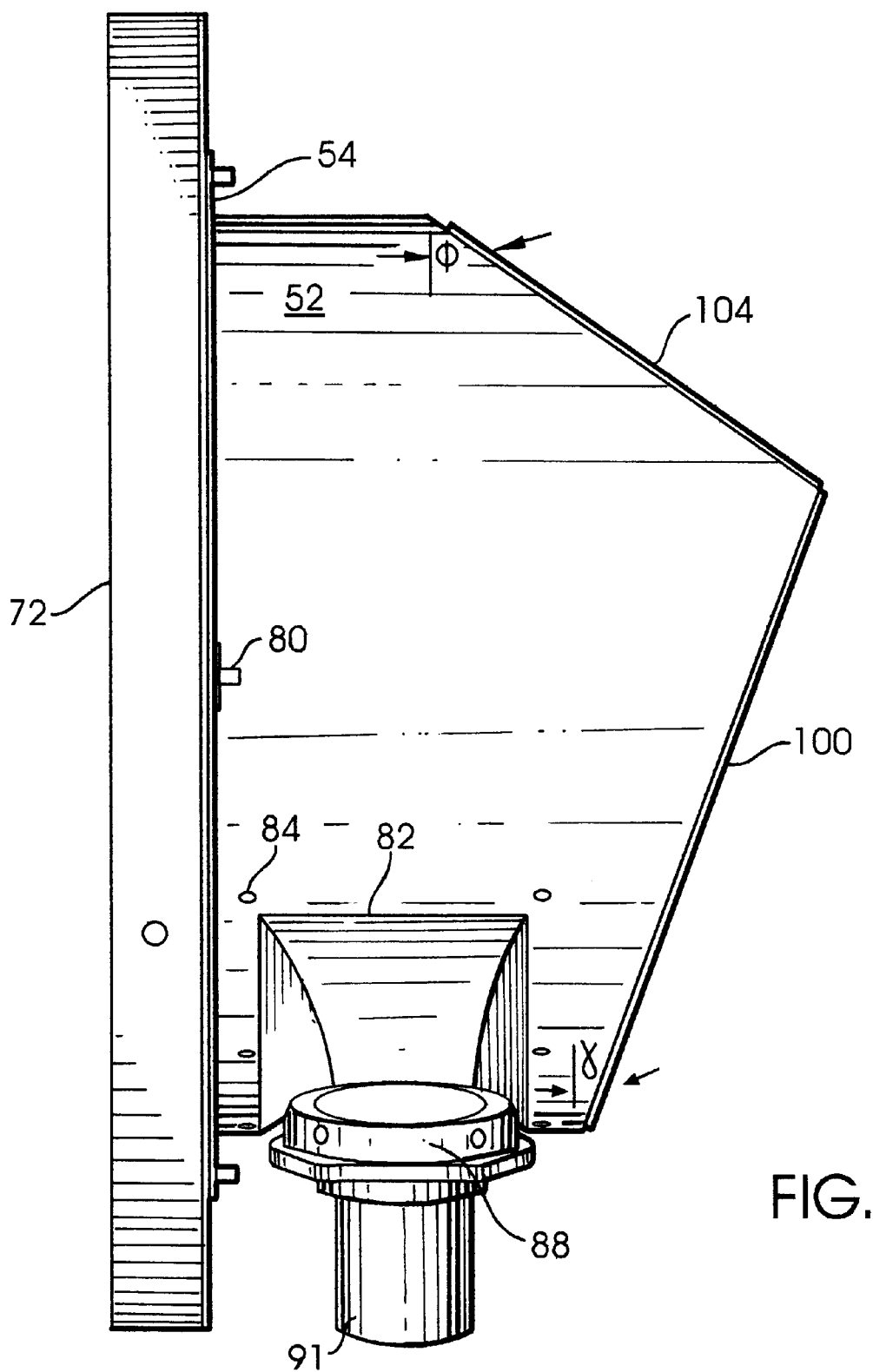
FIG. 12 is a top view of the apparatus of FIG. 11.
Figure 13:
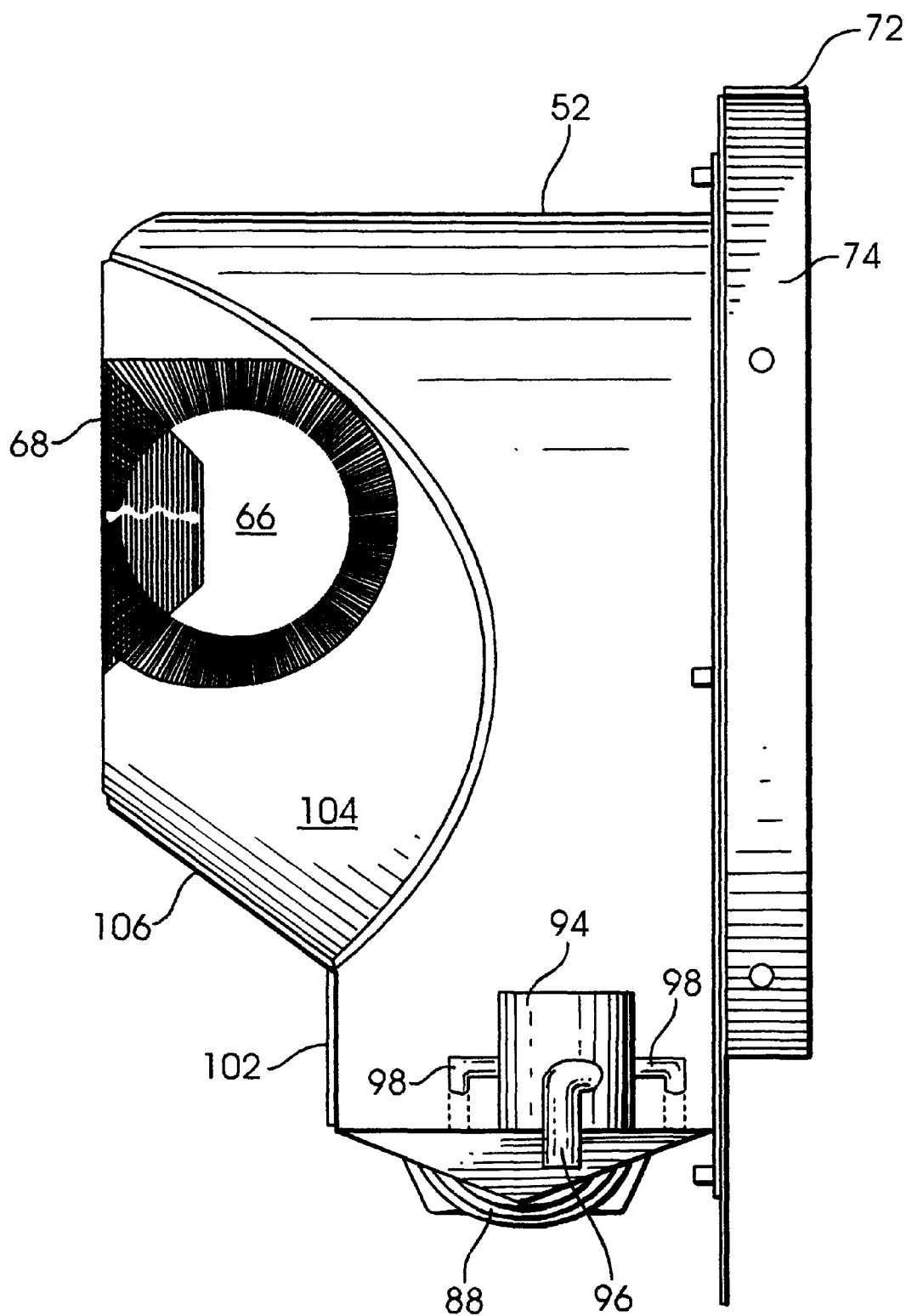
FIG. 13 shows a workpiece-opening end view of the apparatus of FIG. 11.
Figure 14:
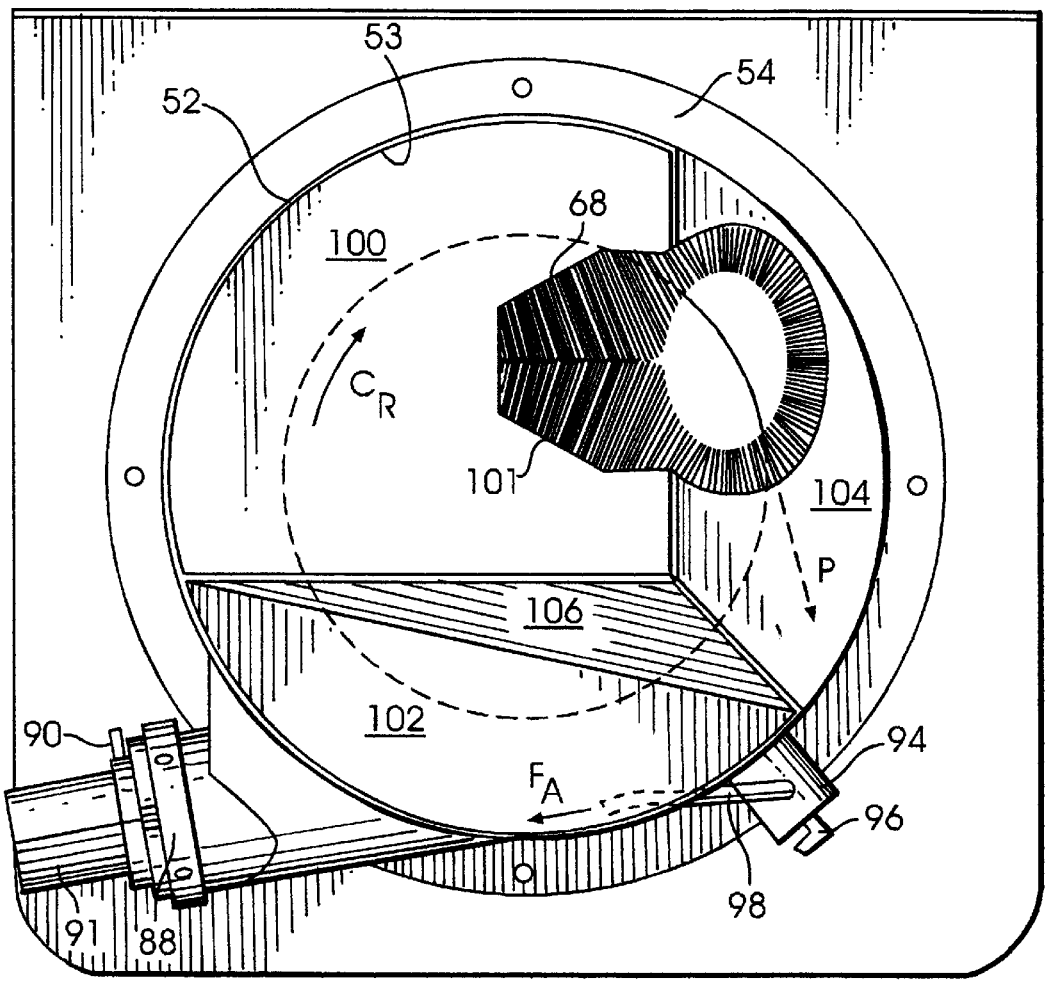
FIG. 14 illustrates a front view of the apparatus of FIG. 11.

In FIG. 10, chips emanating from a machining operation, in which a cutting tool is rotating in a counter-clockwise direction $C_R$ (when viewed in FIG. 10), are projected outward from the tool-workpiece interface along a direction P. Upon striking the curved inside surface 53 of peripheral portion 52, the momentum of the chips will cause the majority of them to travel in a counter-clockwise direction along the curved inside surface 53 and enter into outlet 86. From outlet 86, chips may be deposited directly into an appropriate receptacle or onto a chip conveyor. Usually, however, chips are transported via a conduit (not shown) of a desired type to a receptacle or conveyor.

The flow of chips from the outlet 86 may be assisted by vacuum means (not shown) at a point along the conduit to enhance chip flow through the conduit. A vacuum means also will enhance movement of the chips within the apparatus 50 toward the chip outlet 86. Alternative to a vacuum means, or in addition thereto, the chip removal apparatus 50 may further include an air flow amplifier assembly 88 (FIG. 10) at the outlet 86 to speed the flow of chips from the outlet 86. Examples of air flow amplifiers include venturis, ejectors and Coandas with preferred air flow amplifiers being the Air-Tec model AM series. Preferably, the air flow amplifier assembly 88 is supplied with compressed air at about 60–90 pounds per square inch (psi) via supply pipe 90 which results, respectively, in an output $F_c$ of 230–315 Standard Cubic Feet per Minute (SCFM) via outlet 91, which, for the Air-Tec model AM40 is 2.00 inches in diameter. With either vacuum or air flow amplifier assistance, means to slow the air flow and separate chips from the flow of air may also be included, for example, a cyclone separator or an open or closed deceleration drum system.

It is to be understood that a vacuum and/or air flow amplifier as well as means to separate chips from the flow of air, as discussed above, may also be included with the embodiment of FIG. 1.

In the event some chips do not reach the outlet 86 but instead gather in the lower region of the peripheral portion 52 (when viewed in FIG. 10), a chip flow assist means 92 (FIGS. 7 and 10) may be included to urge chips toward and/or into outlet 86. Preferably such chip flow assist means 92 includes a distribution chamber 94, inlet 96 and one or more outlets 98 extending into the lower region of peripheral portion 52 to direct a flow of gas, preferably air, $F_A$, along the inner surface of the peripheral portion 52 to urge chips toward and/or into outlet 86 where they will come under the influence of the previously mentioned vacuum or air flow assist means. For this purpose, air pressure in the range of about 5 to about 30 pounds per square inch (psi) supplied to the distribution chamber 94 is usually sufficient. Alternative to the chip flow assist means 92 of FIGS. 7 and 10, means to provide a gaseous (preferably air) curtain or "knife" may be provided to urge chips toward and/or into outlet 86.

Of course it is to be understood that in the event of cutting tool rotation $C_R$ being clockwise (with respect to the view provided by FIG. 10), the chips would be projected such that their movement along the curved inner surface 53 of peripheral portion 52 would also be in a clockwise direction. In this instance, it can be seen that placement of the outlet 86 and the flow assist means 92 would necessarily be opposite that shown in FIG. 10.

FIGS. 11–14 also illustrate the preferred embodiment in which the front surface 56 is altered such that the chip flow apparatus 50 can accommodate a pinion being machined. Front portion 56 comprises a plurality of sections 100, 102, 104 and 106. Front portion sections 100 and 104 are oriented at respective angles $\gamma$ and $\phi$ (see FIG. 12) appropriate for providing the space necessary to accommodate the angular separation between a tool and workpiece. In the case of FIGS. 11–14, the workpiece is a bevel pinion.

Workpiece opening 66 is located primarily in section 104 (FIGS. 13 and 14) and includes compliant seal 68. A portion of section 100 also includes a cut-out portion 101 (FIG. 11) which is occupied by the brush-type compliant seal 68. The additional cut-out portion 101 is necessary to allow for movement of the pinion during formation of its tooth surfaces and/or to accommodate the path of movement by the pinion and its associated workholding equipment when entering and exiting the chip flow apparatus 50.

It should be clearly understood that the arrangement and even the number of the sections comprising the front portion 56 in the present invention may vary depending upon the type of gear being machined, the particular process being carried out, and/or the path required in order to move the workpiece into or out of the chip flow apparatus 50.

While the present invention has been discussed and illustrated from the perspective of a tool extending through opening 78 and a workpiece being inserted and withdrawn through opening 66, the invention is not to be limited in this manner. The principles of the present invention apply equally to arrangements where a workpiece would extend through opening 78 and a tool inserted and withdrawn through opening 66.

The chip enclosure of the present invention is particularly advantageous in dry machining processes for producing gears such as cutting bevel ring gears and pinions, preferably with carbide or coated steel tooling, by face milling or face hobbing methods.

The present invention enables chips emanating from a machining process to be contained and quickly conveyed out of a machine tool. By restricting the area in which the chips may travel, exposure of sensitive surfaces of the machine tool to chips is prevented as is the flow of process heat from the chips to machine components thus reducing the possibility of dimensional changes due to heating. Also with the present invention, the need for some guarding mechanisms on the machine tool is greatly reduced since the flow of chips is contained within the chip removal apparatus.

While the invention has been described with reference to preferred embodiments it is to be understood that the invention is not limited to the particulars thereof. The present invention is intended to include modifications that would be apparent to those skilled in the art to which the subject matter pertains without deviating from the spirit and scope of the appended claims.

What is claimed is:

1. An apparatus for directing chips emanating from a workpiece being machined by a tool toward, or toward and into, an outlet spaced from said workpiece, said apparatus comprising:

an enclosure surrounding said workpiece and tool for confining said chips emanating from said workpiece to said enclosure for removal via said outlet, said enclosure comprising an inner surface toward which said chips are projected and upon contact by said chips, said inner surface guiding said chips toward, or toward and into, said outlet.

2. The apparatus of claim 1 wherein said enclosure comprises:

a peripheral portion having a curved inner surface, first and second ends, and an outlet, said first end being positionable adjacent a machine tool and about one of a tool or workpiece, said second end having a front portion attached thereto, said front portion comprising at least one section arranged in a predetermined manner for providing space within said enclosure necessary to accommodate an angular separation between said tool and workpiece, said front portion including an opening through which the other of said tool or workpiece is movable into and out of said enclosure, whereby a majority of chips emanating from said workpiece during machining are projected toward and collide with said curved inner surface, after which said majority of chips travel along said curved inner surface to said outlet.

3. The apparatus of claim 2 wherein said curved inner surface is circular.

4. The apparatus of claim 2 further including vacuum means or air flow amplifying means connected to said outlet.

5. The apparatus of claim 2 further including means to project a gaseous stream along a portion of said curved inner surface in a direction toward said outlet whereby chips lying proximate said outlet are urged into said outlet.

6. The apparatus of claim 1 wherein said enclosure comprises spaced-apart first and second wall portions, a top portion, a bottom portion, a first end portion comprising separate tool and workpiece openings, a second end portion and said outlet located proximate the intersection of said bottom portion and said second end portion, whereby a majority of chips emanating from said workpiece are projected toward and collide with said second end portion after which said majority of chips fall along said second end portion to said outlet.

7. The apparatus of claim 6 wherein said outlet is located in said bottom portion adjacent said second end portion.

8. The apparatus of claim 6 wherein said outlet is located in said second end portion adjacent said bottom portion.

9. The apparatus of claim 6 further including said bottom portion being sloped toward said outlet.

10. The apparatus of claim 6 further comprising means to project a gaseous stream along said bottom portion for urging chips to said outlet.

11. The apparatus of claim 10 further comprising vent means.

12. The apparatus of claim 6 wherein said first end portion is generally semi-circular in shape.

13. The apparatus of claim 12 wherein said first end portion further includes means to project a gaseous stream along at least a portion of said semi-circular shape for urging chips toward said outlet.

14. The apparatus of claim 13 further comprising vent means.

15. The apparatus of claim 6 wherein said first end portion and a section of each of said first and second wall portions are removable from the remainder of said enclosure.

16. The apparatus of claim 15 wherein said first end portion and said sections of said first and second wall portions are removable as a unit.

17. An apparatus for directing chips emanating from a workpiece being machined by a tool toward an outlet spaced from said workpiece, said apparatus comprising:

an enclosure surrounding said workpiece and tool for confining said chips emanating from said workpiece to said enclosure and directing said chips to an outlet for removal from said enclosure, said enclosure comprising a peripheral portion having a curved inner surface, first and second ends, and an outlet, said first end being positionable adjacent a machine tool and about one of a tool or workpiece, said second end having a front portion attached thereto, said front portion comprising at least one section arranged in a predetermined manner for providing space within said enclosure necessary to accommodate an angular separation between said tool and workpiece, said front portion including an opening through which the other of said tool or workpiece is movable into and out of said enclosure, whereby a majority of chips emanating from said workpiece during machining are projected toward and collide tangentially with said curved inner surface, after which said majority of chips travel along said curved inner surface to said outlet.

18. The apparatus of claim 17 wherein said curved inner surface is circular.

19. The apparatus of claim 17 further including vacuum means or air flow amplifying means connected to said outlet.

20. The apparatus of claim 17 further including means to project a gaseous stream along a portion of said curved inner surface in a direction toward said outlet whereby chips lying proximate said outlet are urged into said outlet.

21. The apparatus of claim 17 further including a mounting flange secured to said first end of said peripheral portion.

22. The apparatus of claim 21 wherein said mounting flange is secured to a backing plate which is attachable to a machine tool, said backing plate having an opening therein through which one of a tool or workpiece can pass when attaching said backing plate to said machine tool.

23. A method of directing chips emanating from a workpiece being machined by a tool away from said workpiece, said method comprising:

providing an enclosure surrounding said workpiece and tool for confining said chips emanating from said workpiece to said enclosure for removal via an outlet, said enclosure comprising a peripheral portion having a curved inner surface, first and second ends, and an outlet, said first end being positionable adjacent a machine tool and about one of a tool or workpiece, said second end having a front portion attached thereto, said front portion comprising at least one section arranged in a predetermined manner for providing space within said enclosure necessary to accommodate an angular separation between said tool and workpiece, said front portion including an opening through which the other of said tool or workpiece is movable into and out of said enclosure, machining said workpiece with said tool, a majority of chips emanating from said workpiece being projected toward said curved inner surface and colliding therewith, and thereafter traveling along said curved inner surface toward said outlet.

24. The method of claim 23 further comprising:

providing means to project a gaseous stream along at least a portion of said curved inner portion in a direction toward said outlet, projecting said gaseous stream along said at least a portion of said curved inner surface to urge chips lying on said curved inner surface to said outlet.

25. The method of claim 23 further comprising:

providing means to effect increased air flow from said outlet, said means comprising vacuum means or air flow amplifying means.

26. The method of claim 23 wherein said machining is a dry machining process.

27. The method of claim 26 wherein said dry machining process comprises machining bevel gears.

28. The method of claim 23 wherein said tool comprises carbide.

* * * * *